United States Patent [19]

Kubo et al.

[11] 4,408,290

[45] Oct. 4, 1983

[54] METHOD AND DEVICE FOR DETERMINING ACCELERATION AND/OR DECELERATION OF A MOVING OBJECT

[75] Inventors: Jun Kubo, Hino; Minoru Honda, Yokohama, both of Japan

[73] Assignee: Nissan Motor Company, Limited, Yokohama, Japan

[21] Appl. No.: 223,845

[22] Filed: Jan. 9, 1981

[30] Foreign Application Priority Data

Jan. 14, 1980 [JP]  Japan ................................. 55-2143

[51] Int. Cl.³ .......................... G06F 15/20; G01P 3/42
[52] U.S. Cl. ..................................... 364/566; 324/162; 361/236
[58] Field of Search ................. 364/565, 566; 324/161, 324/162; 361/236, 242; 73/511, 514, 517 R, 518

[56] References Cited

U.S. PATENT DOCUMENTS

| | | | |
|---|---|---|---|
| 3,780,346 | 12/1973 | Gagnon ................................. | 317/5 |
| 3,943,345 | 3/1976 | Ando et al. ........................... | 364/566 |
| 4,267,575 | 5/1981 | Bounds ................................. | 364/565 |
| 4,315,213 | 2/1982 | Wolff .................................... | 324/162 |
| 4,336,497 | 6/1982 | Woodhouse et al. ................. | 324/162 |

FOREIGN PATENT DOCUMENTS

1131538  10/1968  United Kingdom .

*Primary Examiner*—Jerry Smith
*Attorney, Agent, or Firm*—Schwartz, Jeffery, Schwaab, Mack, Blumenthal & Koch

[57] ABSTRACT

An acceleration sensor acts on the variable-frequency pulses of a speed sensor signal to recognize any variation of the pulse period thereof and to produce an output indicative of the magnitude of the detected variation to within a fixed degree of accuracy. The periods of groups of known, variable number pulse groups are measured with reference to a fixed-frequency clock pulse signal and the measurement periods of successive groups of equal numbers of pulses are compared. If the difference between pulse group periods is zero or less than a predetermined value, the number of pulses in each group is increased in order to increase the total number of clock pulses during the measurement interval. The number of pulses per group is increased until the difference between measured periods exceeds the predetermined value or until the number of pulses per group reaches a predetermined maximum. Acceleration rate calculations and memory control procedures are designed to take into account the variation of the number of pulses per group.

28 Claims, 17 Drawing Figures

(A) PATTERN I (B) PATTERN II (C) PATTERN III (D) PATTERN IV

FIG.7

| PULSE NUMBER | DIFFERENCE OF FREQUENCY | SHIFTING PATTERN | PULSE NUMBER NEXTCYCLE | DECISION SIGNAL |
|---|---|---|---|---|
| 1 | "1" (PRESENCE) | I | 1 | "1" |
| 2 | | II | | |
| 4 | | | | |
| 8 | | | | |
| 1 | "0" (ABSENCE) | III | 2 | |
| 2 | | | 4 | |
| 4 | | | 8 | |
| 8 | | II | 1 | "0" |
| MAIN CONTROLLER 40 | Df | SHIFT | N | β |

| PATTERN | 1 | 2 | 3 |
|---|---|---|---|
| COUNTER OUTPUT | 0 1 2 3 4 | 0 1 2 3 4 | 0 1 2 3 4 |
| $S_I$ A | 0 0 0 X X | 0 0 0 0 0 | 0 0 0 X X |
| $S_O$ A | 1 0 0 X X | 1 0 1 0 0 | 0 0 0 X X |
| $S_I$ B | 0 0 0 X X | 0 0 0 0 0 | 0 0 0 X X |
| $S_O$ B | 1 0 0 X X | 1 0 1 0 0 | 1 0 0 X X |
| $S_I$ C | 0 1 0 X X | 0 1 0 1 0 | 0 1 0 X X |
| $S_O$ C | 1 1 0 X X | 1 1 1 1 0 | 1 1 0 X X |
| R | 0 0 1 X X | 0 0 0 0 1 | 0 0 1 X X |

4,408,290

METHOD AND DEVICE FOR DETERMINING ACCELERATION AND/OR DECELERATION OF A MOVING OBJECT

BACKGROUND OF THE INVENTION

The present invention relates to a method and device for determining varying acceleration or deceleration of an object, particularly acceleration or deceleration of an automotive vehicle wheel for use as part of an anti-skid control in a brake control system. More specificaly, the invention relates to a method and device for the acceleration and deceleration of an automotive vehicle wheel. The device measures the pulse period of a wheel rotation speed sensor signal by measuring the time interval over which suitable numbers of sensor signal pulses are received.

In accordance with automotive anti-skid brake control systems, it is necessary to effectively and accurately determine acceleration or deceleration of at least one automotive vehicle wheel. In various anti-skid control systems, a typical skid-control procedure is to determine a target wheel rotation speed based on the acceleration and/or deceleration thereof, and to control the actual wheel rotation speed to correspond with the target wheel rotation speed. The acceleration and/or deceleration of a wheel is determined by differentiation of a difference between wheel rotational speeds during a period and an immediately preceding period. Such an anti-skid control technique requires the accurate and rapid determination of the acceleration and/or deceleration $\alpha$ over a significant range of vehicle speed. The acceleration and/or deceleration of the vehicle is generally obtained from the following equation in which the intervals between successive pulses of a sensor signal fed from the wheel rotation speed sensor are denoted as $Tn-1, Tn, Tn+1 \ldots$:

$$\alpha = K\left(\frac{1}{Tn} - \frac{1}{Tn-1}\right) / \frac{(Tn-1 + Tn)}{2}$$

where $K$ is constant.

In such a conventional system it is only possible to determine the difference in pulse period between each successive pulses. This creates a problem in that when the wheels, that rotate at a high velocity, the difference between successive pulse periods approaches zero which lowers the resolution of the calculated value of the acceleration and/or deceleration rate. This disadvantage is clearly illustrated in the following example.

If the brakes are applied to a vehicle moving at a speed of 100 km/h to decelerate at a rate of 0.1 G and assuming the pulse period of the wheel rotation speed sensor signal is measured with reference to a 1 $\mu$s clock pulse, the pulse period of both the first and second sensor signal pulses $Tn-1$ and $Tn$ will be 522 $\mu$s. Thus, it is practically impossible to measure the difference between successive pulse periods. In order to eliminate the foregoing disadvantage of the conventional system, the system can be modified to measure the difference between successive intervals over which a predetermined number of pulses of the wheel rotation speed sensor are received. For example, in the above case of acceleration of 0.1 G from speed of 100 km/h with a 1 $\mu$s clock pulse, the deceleration rate $\alpha$ can be adequately resolved by measuring the periods of successive of pulses. Note that under the same conditions as those specified above, except starting from the relatively low speed of 10 km/h, the period of a group of 8 pulses would be on the order of 40 ms. Therefore, according to this procedure, the difference between the pulse periods of adjacent groups of vehicle speed sensor pulses, which operating at high speeds, can be satisfactorily resolved. However, for determining the difference of the pulse periods are relatively low speeds the pulse grouping technique involves a rather long period of time (e.g. yoms at 10 km/h) which makes it difficult to effectively employ anti-skid brake control techniques.

Therefore, in conventional systems for determining acceleration and/or deceleration of wheel rotation, it is desirable to provide a system or device capable of accurately determining changes in vehicle speed sensor pulse group period and of minimizing the period of time need for determining those changes.

SUMMARY OF THE INVENTION

It is an object of the present invention to provide a method and device for effectively determining changes in speed sensor pulse group period in which the number of pulses comprising each group of pulses is increased at a given rate until the difference between the pulse group periods of compared groups of sensor signal pulses exceeds a predetermined value.

According to the present invention, there is provided a device for determining the acceleration of a moving object, for example the acceleration and/or deceleration of a rotation vehicle wheel of an automotive vehicle, comprising a sensor means for sequentially determining the instantaneous speed of the object and producing a pulse signal, the frequency of which is proportional to the determined speed, a clock signal generator generating a clock signal, the pulse period of which represents a unit time for the speed measurement, memory means for storing data indicative of measured pulse group periods of the sensor signal and an arithmetic means for effecting arithmetic operations for determining acceleration or deceleration of the moving object based on the stored data in the memory means. The device further comprises a means for detecting the presence of at least a minimal difference between successively measured sensor group periods and generating a command for increasing the number of pulses to be constituting a sensor signal period measured group, hereinafter referred to as a pulse group or group, when the difference between periods of successive pulse groups does not exceed a predetermined value. The device periodically increments the number of pulses which comprises a group, hereinafter referred to as a pulse number until the difference between successive sensor signal group periods is determined to be more than the predetermined value or until the number of pulses becomes equal to a given maximum.

In the preferred embodiment, the device further comprises a controller means for detecting the presence or absence of a change in of sensor signal frequency and for controlling of pulse number based upon results of arithmetic operations.

According to the present invention, a method for determining acceleration or deceleration of the moving object comprises the steps of determining the instantaneous speed of the object and producing a pulse signal, the frequency of which is proportional to the determined speed, measuring the pulse period of the pulse signal with a clock signal, the period of which serves as a unit time for measurement, comparing the measured period of pulse signal with the previously measured period to determine any difference there between, performing arithmetic operation for determining the acceleration or deceleration based upon the determined difference and outputting the obtained result of the arithmetic operations. The method further comprises the steps of determining whether the difference between successively measured periods of the sensor signal is larger than a predetermined value and increasing the period over which the sensor signal is measured if the difference between pulse group periods does not equal the predetermined value.

In the preferred embodiment, the maximum number of pulses to be is set at a predetermined maximum to limit the increment operation. When the pulse member is set at the maximum and the difference between successive sensor signal group periods does not exceed the predetermined value, the speed of the object is recognized as being constant.

BRIEF DESCRIPTION OF THE DRAWINGS

The present invention will become more fully understood from the detailed description of the invention given hereinafter and from the accompanying drawings of a preferred embodiment of the invention which, however, should not be taken as limiting the invention thereto but only for elucidation and explanation only.

In the drawings:

FIG. 7 is a table showing the operation of the main control;

DESCRIPTION OF THE PREFERRED EMBODIMENT

Figure 1:
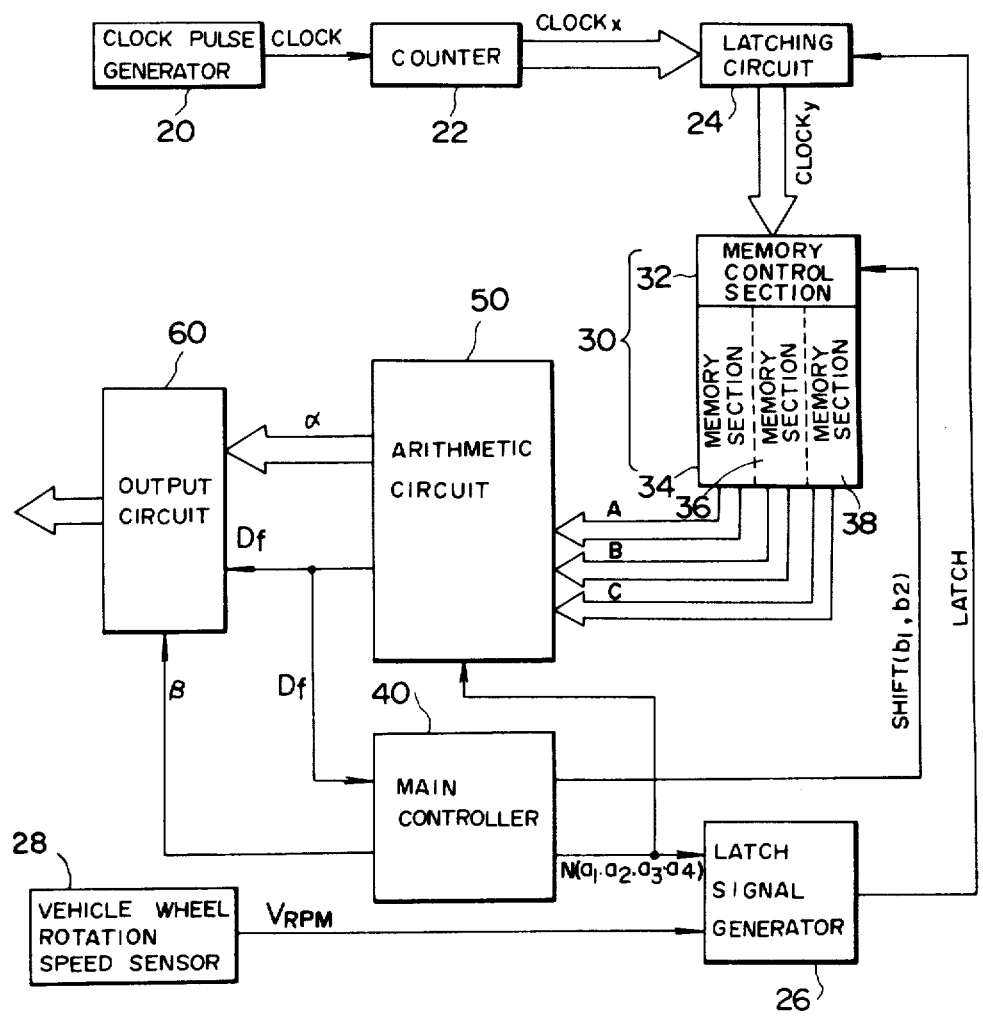
FIG. 1 is a schematic block diagram of a preferred embodiment of a device for determining acceleration and/or deceleration rate of an automotive vehicle according to the present invention, in which is shown a general circuit construction of the device.

Referring now to the drawings, particularly to FIG. 1, there is illustrated a general circuit construction of a preferred embodiment of a device for determining acceleration or deceleration of a moving object. The device 6 according to the present invention may be ap plied any system wherein the acceleration of a moving object is determined. Illustrated and described hereinafter one example of an application of the device wherein it is applied for determining the acceleration or deceleration of an automotive vehicle or the wheel rotation speed thereof. A clock pulse generator 20 generates a clock signal CLOCK having a given constant. The period of a sensor signal $V_{RPM}$, indicative of a determined vehicle speed or wheel rotation speed, is generated by a vehicle speed sensor 28. It is preferable that the clock signal CLOCK has a period corresponding to a unit time of measurement, such as 1 ms or 1 μs or the like. In the preferred embodiment, 1 μs clock signal CLOCK is generated by the clock pulse generator 20. The clock signal CLOCK is fed to a counter 22. The counter 22 counts the inputted clock signals CLOCK and generate a signal $CLOCK_x$, indicative of the counter value. In practice the counter signal $CLOCK_x$ can be any suitable form of electric signal, such as analog signal, digital signal or the like, however, in the shown preferred embodiment, it is a 8 bit binary signal indicative of the counter value. The counter signal $CLOCK_x$ is fed continuously to a latching circuit 24. The latching circuit 24 is responsive to a latch signal LATCH generated in a latch signal generator 26 which receives the sensor signal $V_{RPM}$ from the vehicle speed sensor 28. The sensor signal $V_{RPM}$ is a pulse signal having a frequency proportional to the determined vehicle speed or wheel rotation speed. The latch signal generator 26 counts the pulse of the sensor signal $V_{RPM}$ and generates the latch signal LATCH when the number of pulses counted equals a pre-set value. The pre-set value at which the latch signal LATCH is to be generated is determined by a main controller 40 which is described in detail hereafter.

Responsive to the latch signal LATCH, the latching circuit 24 latches the value of the counter signal $CLOCK_x$ at the time latch signal LATCH is received. Specifically, the latching circuit 24 latches the counter signal value to correspond to the pulse group period of the pre-set number of sensor signal pulses. A latched counter signal value $CLOCK_y$ is outputted from the latching circuit 24 to a memory unit 30 in the form of an 8 bit binary signal. The memory unit 30 comprises a memory control section 32 and three memory sections 34, 36 and 38. The memory control section 32 receives the latching circuit output $CLOCK_y$ and a shift control signal SHIFT from the main controller 40 in the form of a 2 bit binary signal. Based upon the shift control signal SHIFT, the memory control section 32 selects one of the memory sections 34, 36 and 38 in which to store the inputted latched value $CLOCK_y$.

The memory sections 34, 36 and 38 comprise shift registers which store successive latched values of $CLOCK_y$ in a predetermined order.

For convenience of explanation, the latched values $CLOCK_y$ outputted sequentially by the latching circuit 24 will be labeled A, B, C . . . , and it will be assumed that the earliest latched value A is initially stored in the section 34 and the most recent latched value C is initially stored in the section 38.

It should be appreciated that each value A, B, C . . . is stored in the memory section 34, 36 and 38 as a binary number and therefore to the shift resisters of the memory sections are adapted to store digital values.

Figure 2:
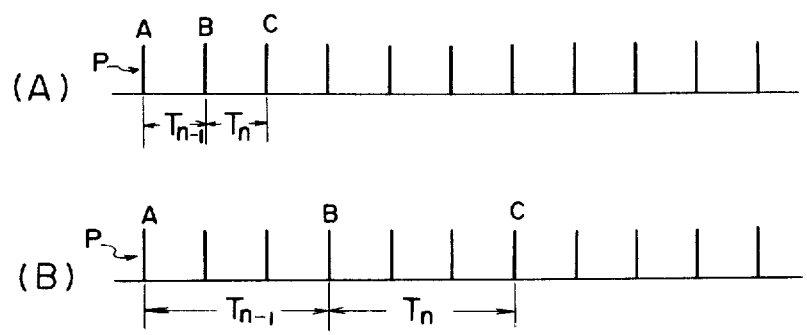
FIG. 2 is an illustration showing vehicle speed sensor pulse, in which chart (A) shows an example in which the period of individual pulses are measured and chart (B) shows an example in which the period of groups of three pulses are measured.

An arithmetic circit 50 reads out the stored values A, B, C . . . from the memory unit 30 and determines the difference between consecutive latched values A, B, C . . . , for example (B-A), (C-B), to determine the pulse group period for each of the periods Tn−1 and Tn shown in FIG. 2. The arithmetic circuit 50 further calculates (C-B)-(B-A) to obtain the difference between the determined pulse group periods. The difference value thus obtained is compared with a predetermined value to determined whether the period of sensor signal has varied between the periods Tn−1 and Tn.

The arithmetic circuit 50 generates a binary code signal $D_f$ based on the result of this operation. If there is a change in sensor signal frequency, the value of the binary code signal $D_f$ is set to 1. If there is no change, it is set to 0. The binary code signal $D_f$ is fed to an output circuit 60 and the main controller 40.

At the same time, the arithmetic circuit 50 calculates the acceleration and/or deceleration rate $\alpha$ of the vehicle or vehicle wheel speed based on the read out stored value A, B and C. The acceleration and/or deceleration rate $\alpha$ can be obtained from the following equation:

$$\alpha = N \left( \frac{1}{C-B} - \frac{1}{B-A} \right) / \left( \frac{C-A}{2} \right)$$

where N represents the number of pulses required in a group. The calculated value of the acceleration and/or deceleration rate $\alpha$ is also fed to the output circuit 60.

The main controller 40 is responsive to binary code signal $D_f$ to determine the number of pulses to be grouped. Also, the main controller 40 determines a shifting pattern for shifting the data in the memory section 34, 36 and 38. In other words, based upon the binary signal code $D_f$, the main controller 40 generates a pulse number signal N and a shift control signal SHIFT. The pulse number signal N is a 4-bit binary code signal and the shift control signal SHIFT is a 2 bit binary code signal. Further, the main controller 40 receives an input indicating whether the frequency of the sensor signal has changed between two consecutive periods, e.g., $T_{n-1}$ to $T_n$, based upon the binary code signal $D_f$ fed from the arithmetic circuit 50. The main controller 40 increases at a given rate the number of pulses to be grouped and therefore increments the value of the pulse number N, if the value of the binary code signal $D_f$ is zero. The shift control signal SHIFT is modified so as to adapt the shifting pattern the incremented value of the pulse group number. At the same time, the main controller 40 generates a decision signal $\beta$ which normally has value 1. If the pulse number has been incremented to a predetermined maximum value but the binary code signal $D_f$ remains at in zero, the value of the decision signal $\beta$ goes to zero. The decision signal $\beta$ is fed to the output circuit 60 to finally determine the output therefrom.

Next, the details of the each of the circuits which make up the device of the present invention will be described with reference to FIGS. 4 to 14.

Figure 3:
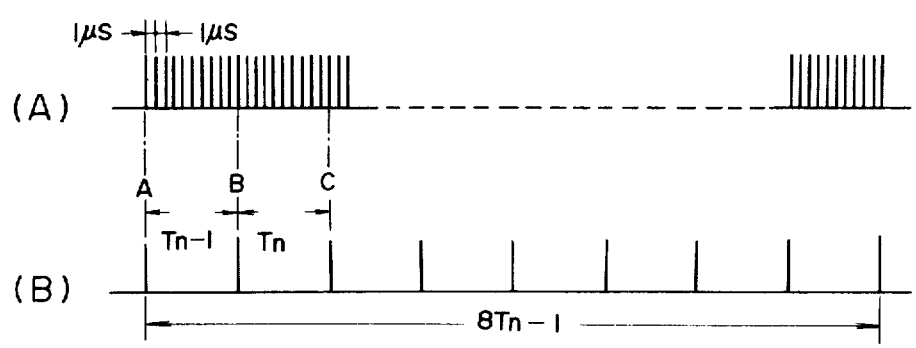
FIG. 3 is an illustration showing in exemplary relationship between clock pulses and sensor signal pulses.
Figure 4:
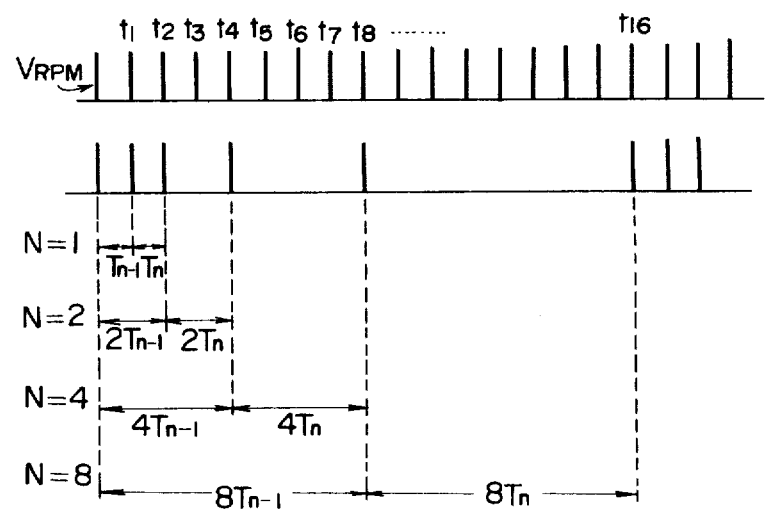
FIG. 4 is an illustration showing an example of a set of pulse groups useful for determining acceleration.
Figure 5:
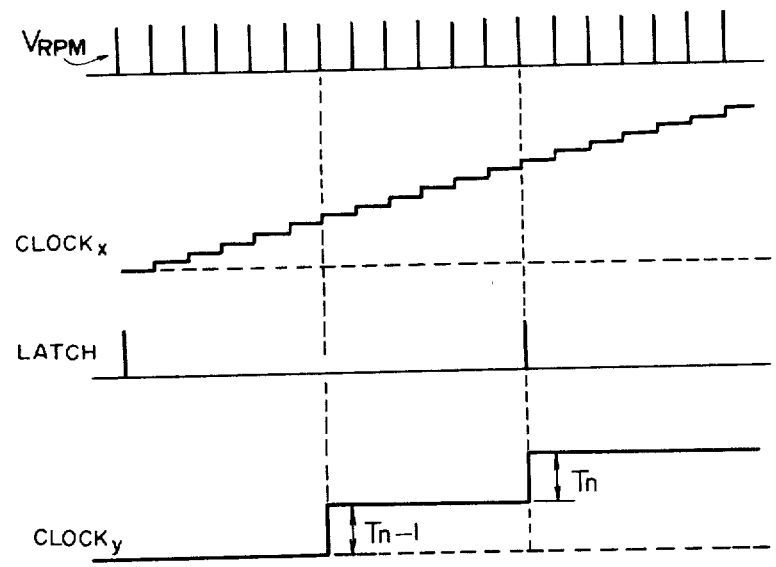
FIG. 5 is a timing chart for the operation of a means for determining pulse group period of the sensor signal.

Referring now to FIGS. 4 and 5, there is illustrated an example of incrementing the pulse number and the relationship between the sensor signal $V_{RPM}$, the counter value $CLOCK_x$, the latch signal LATCH and the latched value $CLOCK_y$. In the description which follows, the labels and assumptions used in connection with FIGS. 1-3 will be maintained.

In FIG. 4, the pulse number signal N generated by the main controller 40 is initialized to 1 and therefore the period of each adjacent sensor signal pulse is compared. Specifically, the pulse period, Tn−1 latched at time $t_1$ is compared with the period Tn, latched time $t_2$. If the pulse periods Tn−1 and Tn are substantially equal to one another or if the difference therebetween is so small that it can not be resolved, the main controller 40 increments the value of the pulse number signal N to 2. Responsive to the incrementation of the pulse number the pulse periods Tn−1 and Tn are added and are regarded as a pulse group period 2Tn−1. That is, the interval duration $t_0$ to $t_2$ wherein the first and second sensor signal pulses are inputted is regarded as one period of the new pulse group. The new pulse group period 2Tn−1 is compared to the pulse group period 2Tn measured over a time interval from $t_2$ to $t_4$. As before, the of pulses to be grouped is incremented by the main controller 40 if the difference between the periods of the pulse groups cannot be adequately resolved. If the difference between successive pulse group periods is zero or too small to be resolved, the pulse group periods 2Tn−1 and 2Tn are grouped or coupled together to from pulse group having a period of 4Tn−1 indicative of the time interval $t_0$ to $t_4$ during which the first to fourth sensor signal pulses are inputted. The pulse period 4Tn−1 is then compared with the pulse period 4Tn measured over the time interval $t_4$ to $t_8$.

In the present example, the predetermined maximum number of pulses to be grouped is 8. If the time difference between 8Tn−1 and 8Tn can not be adequately resolved, the main controller 40 determines that the speed of vehicle or wheel rotation has been constant over the interval $t_0$ to $t_{16}$ in which case the main controller 40 returns to its initial position wherein the periods of individual pulses are compared.

In FIG. 5, illustrates the relationships between the signals $V_{RPM}$, $CLOCK_x$, LATCH and $CLOCK_y$ and therefore mainly illustrate the operation of the latching circuit 24. FIG. 5, taken in view of FIG. 4, illustrates an example of counting the pulse group period for a group of 8 pulses. With reference to FIG. 2, the period of a sensor signal pulse $V_{RPM}$ is counted by the clock signal CLOCK. Therefore, the counter 22 counts up the number of clock signal CLOCK and outputs an output $CLOCK_x$ indicative of the counter value. Responsive to latch signal LATCH fed from the latch signal generator 26, the latching circuit 24 latches the value of counter output $CLOCK_x$ and outputs an output $CLOCK_y$ indicative of the latched value. The difference (Tn−1—Tn) between consecutive latched values represents the period of a pulse group measured over that counting interval.

At the end of each cycle of operation for determining the difference between the periods of successive pulse groups or individual pulses, the main controller 40 determines whether the pulse number should be incremented. According to the result of this determination, the shifting pattern of the latched counter A, B, C, ... in the memory unit is determined and the main controller 40 generates the shift control signal SHIFT corresponding to the determined shifting pattern.

Figure 6:
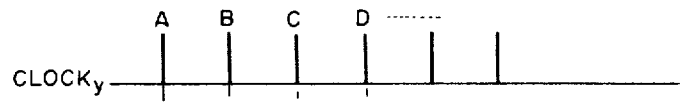
FIGS. 6 (a) to 6(d) are illustrations illustrating various ways of shifting the data stored in a memory unit, each of FIGS. 6(a) to (d) illustrates a different pattern of shifting depending upon the group pulse number.
Figure 6:
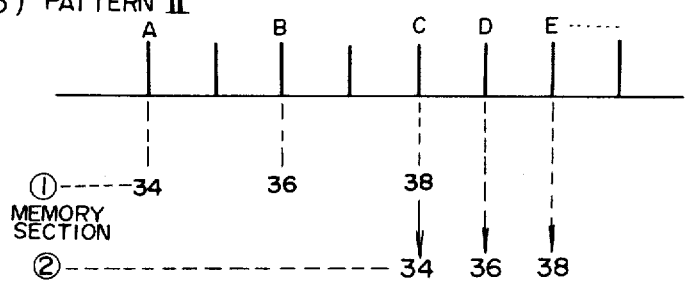
Figure 6:
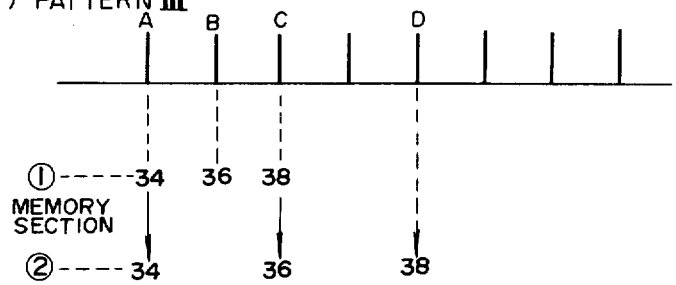
Figure 6:
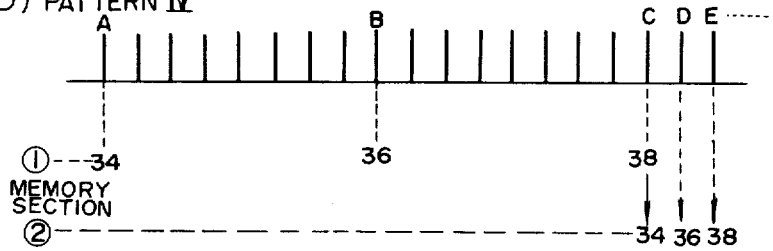

FIG. 6 is explanatory illustration of the various shifting patterns for shifting the stored data A, B, C, .... It should be noted that in FIG. 6, on each horizontal line, the indicia A, B, C, ... at the left side represents the data stored in the memory section 34 and at right side represents data stored in the memory section 38. The first pattern (I), is to be used when a difference between the periods of individual pulses can be adequately resolved. In this case, the data A, B, C, ... in the memory sections 34, 36 and 38 respectively are shifted in a given order. Specifically, the data A in the memory section 34 is cleared and the data B stored in section 36 is shifted to the section 34. Likewise, the data C is shifted to the memory section 36. The data D, as newly latched counter value $CLOCK_p$, is stored in memory section 38.

Turning now to pattern (II), (FIG. 6(b)) the pulse number is reduced by one when the difference between the periods of successive pulse groups equals a predetermined value in the immediately preceeding cycle of operation. FIG. 6(b) illustrates an example where the original pulse group number was 2. A similar pattern shifting is also applicable to pulse groups having 4 or 8 pulses. In those cases, the data A and B respectively stored in the memory sections 34 and 36 are cleared and data C is shifted to the memory section 34. Additional data D and E is respectively stored in the memory sections 36 and 38.

According to (Pattern III, FIG. 6(c)), the pulse number is incremented from that of the immediately preceding cycle. As understood from the foregoing description, this pattern is applied when no difference between the periods of consecutive pulse groups is detected. In this case, the data A in the memory section 34 is maintained therein. The data B in the memory section 36 is cleared and the data C in the section 38 is shifted to the section 36. Fresh data D indicative of the period of the first of the newly incremented pulse groups is newly stored in section 38.

Pattern IV, FIG. 6(d)), is substantially same as the Pattern II (FIG. 6(b)) in the manner of shifting but illustrates the case where no difference between the period of successive pulse groups can be detected until pulse groups with the predetermined maximum number of pulses, i.e., 8 pulses are compared. Having noted the difference between Patterns II and IV, Pattern IV is omitted from further detailed description since it is substantially the same in other respects to each Pattern II.

FIG. 7 illustrates the numerical relationship between the pulse number and the shifting patterns corresponding to the pulse number. As explained above, the determination of the pulse number and selection of the shifting pattern are effected by the main controller 40. Accordingly, the outputs from and the input to the main controller 40 are shown the lowermost column in FIG. 7. As seen from FIG. 7, if there is a difference between the periods of successive pulse groups, the input $D_f$ from the arithmetic circuit 50 is set to 1 and otherwise is set to zero. When the period between successive individual pulses differs detectably, the main controller 40 selects the shifting pattern I and sets the pulse number for next cycle of operation to 1. If the difference of the pulse periods of successive multiple-pulse groups differ detectably, the main controller 40 selects shifting pattern II and sets the pulse number for in the next cycle of operation to 1. As should be clear from the above, any time the periods of successive pulse groups, including single pulse groups, differ detectably, the main controller sets the pulse number for the next cycle of the operation to 1. On the contrary, if no difference is detected while comparing the group periods, the main controller 40 increments the pulse number. In this case, the main controller 40 selects the shifting pattern III according to incrementation of the pulse number. If the incremented pulse numbers reaches the predetermined maximum but no change in the period is detected, the main controller 40 determines that the pulse period is constant in and sets the decision signal $\beta$ to zero. At the same time, the main controller 40 returns the pulse number to 1 and selects the shifting pattern IV.

Figure 8:
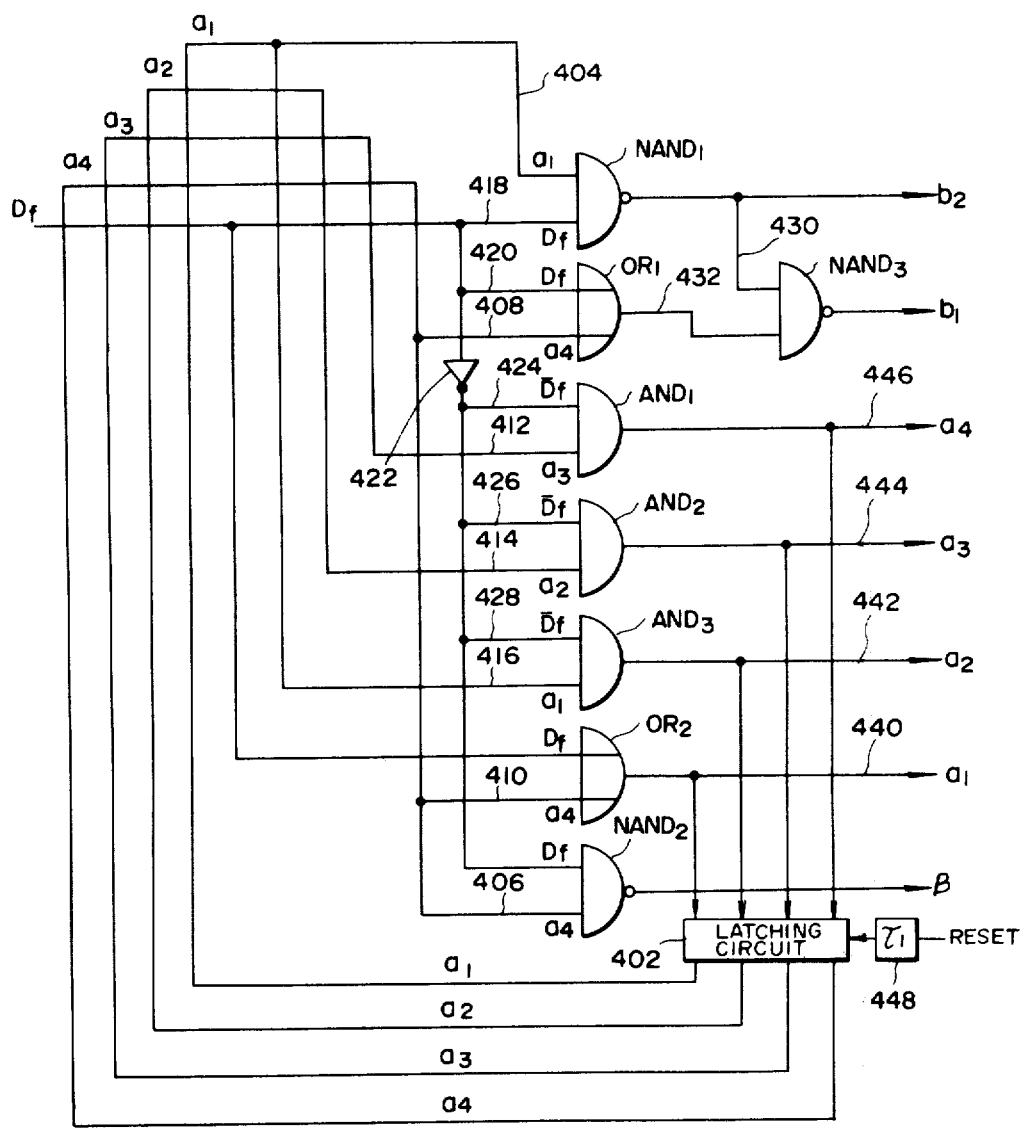
FIG. 8 is a circuit diagram of the main control, which illustrates one manner of determining the pulse number.

Referring now to FIG. 8, there is illustrated a circuit according to a preferred embodiment of the main controller 40 of present invention. The main controller 40 comprises a plurality of AND gates, OR gates, and NAND gates, and a latching circuit 402. As stated above, the pulse number signal N generated by the main controller is a 4-bit binary code, the bits of which are labeled $a_1$, $a_2$, $a_3$ and $a_4$. Likewise, the shift control signal SHIFT is a 2-bit binary code, the bits of which are labeled $b_1$ and $b_2$.

The binary code ($a_1$, $a_2$, $a_3$, $a_4$) representing the value of current pulse number is latched and stored in the latching circuit 402. The value stored in the latching circuit 402 is reset by a reset signal RESET from a logic circuit 320. A delay circuit 448 is interposed between the logic circuit 320 (FIG. 10) and the latching circuit 402. Thereby, the reset signal RESET is inputted to the laching circuit 402 with a predetermined delay time $\tau_1$ in order to reset the storage in the latching circuit. On the other hand, the binary code signal $D_f$ from the arithmetic circuit 50 is inputted to the main controller 40. Synchronously with the binary code signal $D_f$, the binary code ($a_1$, $a_2$, $a_3$, $a_4$) of the pulse number signal N latched in the latching circuit 402 is fed back to a NAND gate $NAND_1$, NAND gate $NAND_2$, OR gate $OR_1$, OR gate $OR_2$, AND gate $AND_1$, AND gate $AND_2$ and AND gate $AND_3$ through feedback lines 404, 406, 408, 410, 412, 414 and 416. The inputs of the $NAND_1$ and $OR_2$ receive the binary code signal $D_f$ from the arithmetic circuit 50 through lines 418 and 420. The inputs of the $AND_1$, $AND_2$ and $AND_3$ receive inverted binary code signal $D_f$ through an inverter 422 and lines 424, 426 and 428. The $NAND_1$ and $OR_1$ determine the shifting pattern and generate the bits ($b_1$, $b_2$) of the shift control signal SHIFT in cooperation with a NAND gate $NAND_3$. Generally, based on bits $a_1$ and $a_4$ *1 of the pulse number signal N and the binary code signal $D_f$,* the $NAND_1$, $OR_1$ and $NAND_3$ gates determine the bits ($b_1$, $b_2$) of the shift control signal SHIFT. In this purpose, the input terminals of the gate $NAND_3$ are connected to the output terminals of the $NAND_1$ and $OR_1$ gates through lines 430 and 432. As apparent from FIG. 8 the bit $b_1$ of the shift control signal SHIFT is determined based on the bit $b_2$ and the output of the gate $OR_1$. The gates $NAND_1$, $AND_2$, $AND_3$ and $OR_2$ respectively determine the bits ($a_1$, $a_2$, $a_3$, $a_4$) of the pulse number signal N based on a preceding value ($a_2$, $a_3$, $a_4$, $a_1$) of the cyclically-offset bits of the previously outputted pulse number signal N and the binary code signal $D_f$ fed from the arithmetic circuit 50. Further, the $NAND_2$ gate sequentially generates a decision signal $\beta$ based on the bit $a_4$ of the pulse number signal previously outputted and the binary code signal $D_f$.

Figure 9:
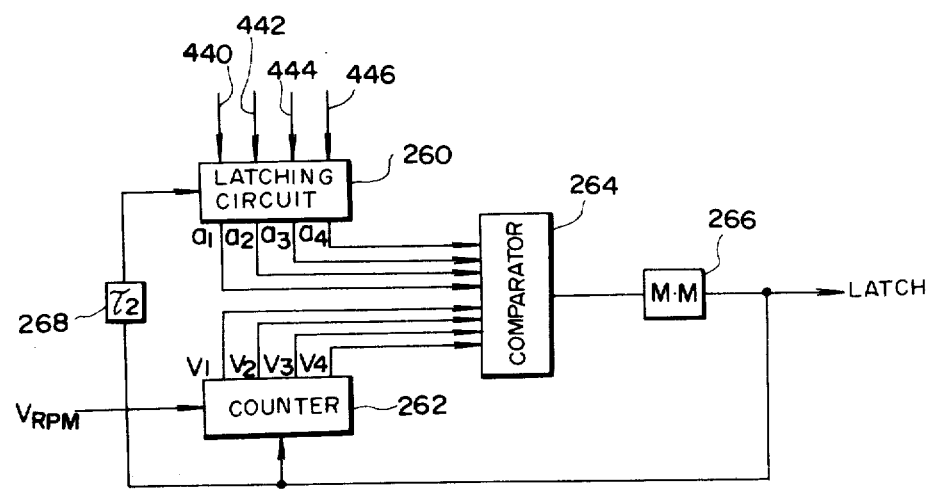
FIG. 9 is a block diagram of a pulse controller.

FIG. 9 illustrates a preferred embodiment of the latch signal generator 26 of the present invention. The latch signal generator 26 generally comprises a latching circuit 260, a counter 262, a comparator 264 and mono-stable multivibrator 266. The bits ($a_1$, $a_2$, $a_3$, $a_4$) of the main controller output, i.e., the pulse number signal N is inputted to the latching circuit 260 via leads 440, 442, 444 and, 446, each connecting an input terminal of the latching circuit 260 to an output terminal of gates $AND_1$, $AND_2$, $AND_3$ and $OR_2$ respectively. The counter 262 receives sensor signal $V_{RPM}$ from the speed sensor 28 and counts the pulses from the sensor signal. The counter 262 generates a binary signal ($v_1$, $v_2$, $v_3$, $v_4$) based on the number of pulses counted and feeds the count to the comparator 264. The comparator also receives the latched pulse number signal N ($a_1$, $a_2$, $a_3$, $a_4$) from the latching circuit 260. The comparator 264 compares the input $V_{RPM}$ ($v_1$, $v_2$, $v_3$, $v_4$) from the counter 262 with the input N ($a_1$, $a_2$, $a_3$, $a_4$) from the latching circuit 260. If the counter value indicated in the binary signal ($v_1$, $v_2$, $v_3$, $v_4$) is equal to the value of the pulse number signal N, the comparator 264 renders the monostable multivibrator 266 operative to generate a latch signal LATCH to be fed to the latching circuit 24. The latch signal LATCH generated by the monostable multivibrator 266 is a one-shot for activating the latching circuit 24 to latch the counter value $CLOCK_x$ therein. The latch signal LATCH is also fed back to the counter 262 to reset the counter value. Likewise, the latch signal LATCH is fed to the latching circuit 260 through a delay circuit 268 with a predetermined time lag $\tau_2$ from when the signal LATCH was received by the counter 262. Responsive to the latch signal LATCH, the contents of the latching circuit 260 are reset.

Thus, the latch signal generator 26 generates the latch signal LATCH when the number of sensor signal pulses counted equals a pre-set value for latching the counted clock signal value $CLOCK_x$ in the latching circuit 24. Thus, when the selected shifting pattern is I or III, (FIGS. 6(a) and (c)) the pulse number circuit 26 generates a latch signal during one cycle of operation and when the selected shifting pattern as II, (FIG. 6(b)) two shift control signals are generated per cycle of operation.

Figures 10, 11:
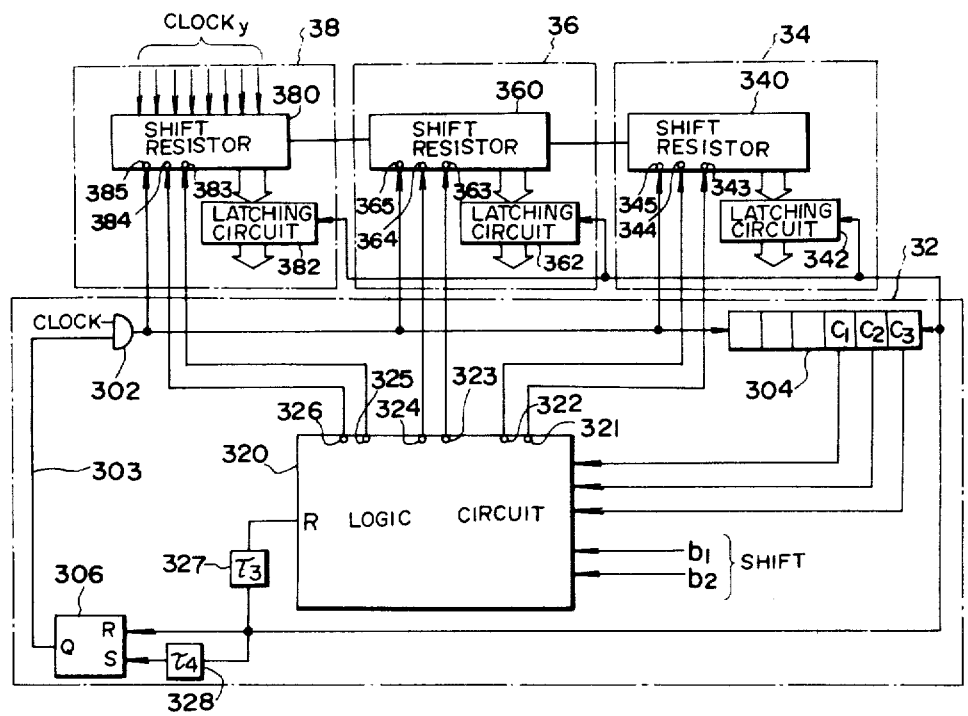
FIG. 10 is a block diagram of a memory means having shift registers which function to shift the determined periods of each group of sensor pulses according to the manner of shifting as shown in FIGS. 6(a) to 6(d)
FIG. 11 is a table showing inputs to each of the input terminals of a logic circuit which corresponds to a pattern of shifting the storage in the shift registors in the memory means.

FIG. 10 illustrates a preferred embodiment of the memory unit 30 including memory control section 32 and memory sections 34, 36 and 38. Each of the memory section comprises a shift register 340, 360 and 380 and associated latching circuits 342, 362 and 382 respectively. The memory control section 32 generally comprises a logic circuit 320 and a counter 330. The logic circuit 320 is connected to the output terminals of the $NAND_1$ and $NAND_3$ gates of the main controller 40 in order to receive therefrom the bits ($b_1$, $b_2$) from the shift control signal SHIFT. Each pair of logic circuit output terminal 321 and 322, 323 and 324, 325 and 326 are respectively connected to input terminal pairs 343 and 344, 363 and 364, 383 and 384 of the shift registers 340, 360 and 380 respectively. The logic circuit 320 generates signals to be fed to respective shift registers 340, 360 and 380. The value of each signal is determined by the shift control signal SHIFT. Each of signals fed from the logical circuit 320 to the shift register 340, 360 and 380 is a binary code having value of either 1 or 0. Based on the combination of the inputted signal value, the functional mode of the shift registers 340, 360 and 380 is determined. Each shift register is capable of functioning in any of the following three modes as follows in accordance with the inputted signal value.

MODE I: when both the input signals are binary zeros, the shift register is not responsive the clock pulses;

MODE II: when the input signals to the input terminal 322, 324 or 326 is a binary 1 and the input signals to the input terminal 321, 323 or 325 is a binary zero, the shift register shifts its storage to right; and MODE III: when the input signal to the input terminal 322, 324 or 326 is zero and the signal to the input terminal 321, 323 or 325 is a binary 1, the shift register receives fresh data in the a form of an 8-bit binary signal as a newly latched counter value $CLOCK_y$ from the latching circuit 24.

Each shift register 340, 360 and 380 sequentially generates an output representative of the stored counter value A, B, C, . . . . The output A, B, C of the shift registers 340, 360 and 380 are inputted to the latching circuits 342, 362 and 382 which also receives reset signals RESET from the logical circuit 320. These reset signal RESET are produced by the logical circuit 320 when all of the shift registers are operating in MODE I and are therefore not responsive to clock pulses. This condition of the shift registers 340, 360 and 380 represents a stable condition at the end of the shifting operation. The latching circuits 342, 362 and 382 are responsive to the reset signal RESET from delay circuit 327 which interposes delay time $\tau_3$. On receipt of the reset signal RESET, the labeling circuit become operative to latch inputs A, B, C, . . . from the shift registeres 340, 360 and 380. After latching the register outputs A, B, C, . . . , the latching circuits 342, 362 and 382 respectively output the latched value A, B, C, . . . to the arithmetic circuit 50.

Each shift register 340, 360 and 380 also receives a clock signal CLOCK from clock signal generator 20 through clock gate 302 and an input terminal 345, 365 and 385. The clock signal CLOCK is also inputted to a clock counter 304 which counts the number of clock signals. Each time the counter 304 counts pulses 8 clock, it increments the number stored in cell bits $c_1$, $c_2$ and $c_3$ by a binary value 1. The clock counter 304 outputs a 3-bit binary signal ($c_1$, $c_2$, $c_3$) to the logic circuit 320. The counter value of the clock counter 304 is reset in response to a reset signal RESET from the logic circuit 320 through delay circuit 327 which interposes a given time delay $\tau_3$.

A flip-flop 306 is positioned between the logic circuit 320 and the clock gate 302 reset input terminal R of the flip-flop 306 is connected to the logic circuit 320 through the delay circuit 327. A set input terminal S is connected to the logic circuit 320 through the delay circuit 327 and another delay circuit 328. Therefore, the reset signal R from the logical circuit 320 is receivedly both of the input terminals R and S but with a different time lag corresponding to $\tau_4$. The delay time $\tau_4$ set in the delay circuit 328 preferably corresponds to the duration ($\tau_4$) of one cycle of operation for determining acceleration and/or deceleration. Thus, the flip-flop 306 is set by the reset signal RESET inputted from the set input terminal with a delay ($\tau_3 + \tau_4$) time given by the delay circuits 327 and 328 and is reset by the reset signal RESET inputted through the delay circuit 327.

The logic circuit 320 also receives a shift control signal SHIFT in the form of binary bits $b_1$ and $b_2$. The logical circuit 320 also receives the clock counter output in the form of binary bits $c_1$, $c_2$ and $c_3$. Based on these inputs, the logical circuit 320 determines the shift mode signals $SHIFT_1$ to $SHIFT_6$, and the reset signal RESET. The relationships between the combinations of the inputs and the shift mode signals $SHIFT_1$ to $SHIFT_6$ are shown in FIG. 11, in the form of a table.

The operation of memory unit 30 will now be described in detail with reference to FIG. 11. In the following description, the functions of the various elements of the memory unit will be explained in connection with a particular shifting pattern.

PATTERN I

At first, the flip-flop 306 assumes its set position responsive to reset signal RESET from the logic circuit 320 through delay circuits 327 and 328. In this state, the flip-flop 306 signal an output to the clock gate 302 through the line 303. Responsive to that output, the clock gate 302 operates to pass the clock signal CLOCK from the clock pulse generator 20 therethrough.

Where the shifting pattern from the main controller 40 is PATTERN I and the counter value of the clock counter 304 is zero so that the shift registers 340, 360 and 380 are generating in MODE II, (defined hereinabove) the stored values in the shift registers 340, 360, 380 are shifted to the right by 1 bit. Until 8 clock signal pulses are counted by the clock counter 304, the counter output ($c_1$, $c_2$, $c_3$) is kept in zero in order that the shift registers 340, 360 and 380 will continue shifting their contents to the right by 1 bit. Responsive to the 8th clock signal pulse, the counter value ($c_1$, $c_2$, $c_3$) becomes 1 to switch the modes of shift registers 340, 360 and 380 to I, I and III respectively. In this position, the shift registers 340, 360 are in states inhibiting clock pulse input and the shift register 380 is operable to receive fresh data from the latching circuit 24. The clock counter 304 is responsive to the 8th pulse inputted after the preceding 8th pulses to increment the counter value to 2. In this counter condition, the shift registers 340, 360 and 380 are all in MODE I thereby inhibiting clock input. At the same time, the logical circuit 320 produces the reset signal RESET with the binary value of 1. After the time delay $\tau_3$ set in the delay circuit 327, the reset signal RESET is received by the flip-flop 306 through the reset input terminal R to turn the flip-flop off. Thus, the output value from the flip-flop goes to zero and closes the clock gate 302. The reset signal RESET is also fed to the clock counter 304 to reset the counter value and to the shift registers 340, 360 and 380 through the delay circuit 327 to cause those registers to output their contents to the respectively corresponding latching circuit 342, 362 and 382 respectively. The latched value in each latching circuit 342, 362 and 382 is then outputted to the arithmetic circuit 50.

PATTERN II

As in the foregoing PATTERN I, at first, the flip-flop 306 is in a set position in response to the reset signal RESET produced by the logic circuit 320 and received via the delay circuits 327 and 328. In this condition, the flip-flop 306 operates an output to the clock gate 302 through the line 303 to open the latter. In this state, the clock signal CLOCK from the clock pulse generator 20 is transmitted to the clock counter 304. As stated above, the shifting pattern selected by the main controller 40 is PATTERN II and since the counter value outputted from the clock counter 304 is zero, the shift register 340, 360 and 380 are in shifting MODE I. Therefore, the data in each shift register 340, 360 and 380 is shifted 1 bit to right. When the 8th clock signal is inputted, the contents A, B, C . . . in the shift registers are shifted 8 bits, and have therefore been shifted into the adjacent register. In other words, the value B previously stored in the shift register 360 is now shifted to the shift register 340 and the value C in the shift register 380 is shifted to the register 360. At this time, the value of the contents of the shift register 380 is zero.

Responsive to the 8th clock signal, the counter value in the clock counter increase to 1. As a result the shifting modes of the shift registers 340 and 360 changes to MODE I, i.e., clock inhibit state, and the shifting mode of the shift register 380 becomes MODE III and is operable to receive fresh data D from the latching circuit 24. Receipt of the next 8 clock signal causes the counter value in the clock counter 304 to increase to 2. In this counter position, shifting modes of the shift registers 340, 360 and 380 are all changed to MODE II. Thereby, the contents of the shift registers shifts 1 bit to the right. This shifting operation of the shift registers 340, 360 and 380 is maintained until the next 8 clock pulses are counted. Thereupon, the data C in the shift register 360 is shifted to the shift register 340 and data D in the shift register 380 is shifted to the shift register 360. Then, the shift register 380 is reset to zero. Thereafter the counter value of the clock counter increases to 3 to switch the shift registers 340 and 360 to shifting mode MODE I, i.e., clock inhibit state. The shift register 380 switches to MODE III to receive fresh data E from latching circuit 24. Thus, the data C, initially stored in the shift register 380, is shifted to the shift register 340 and the shift registers 360 and 380 receive fresh data D and E respectively from the latching circuit in synchronism with the clock signal CLOCK.

As in the foregoing PATTERN I, the shift registers 340, 360 and 380 are all in MODE I to inhibit clock input. At the same time, the logic circuit 320 produces a reset signal RESET having a value of 1. After the time delay $\tau_3$ set in the delay circuit 327, the reset signal RESET to the flip-flop 306 through the reset input terminal R switches the flip-flop output to its low or zero value. Thus, the output from the flip-flop goes to zero thereby closing the clock gate 302. The reset signal RESET is also fed to the clock counter 304 to reset its value and to to the shift registers 340, 360 and 380 through the delay circuit 327 to cause those registers to output the contents therein to the corresponding latching circuits 342, 362 and 382 respectively. The latched value in each latching circuit 342, 362 and 382 is outputtted therefrom to the arithmetic circuit 50.

PATTERN III

As in the foregoing PATTERN I, at first the flip-flop 306 switches to its set position in response to the reset signal RESET produced by the logic circuit 320 and inputted via the delay circuits 327 and 328. The output of the flip-flop 306 is fed to the clock gate 302 to open that gate same. Thus, the clock signal CLOCK fed from the clock pulse generator 20 passes through the clock gate 302 and to the clock counter 304. In this case, since the shifting pattern determined by the main controller 50 is PATTERN III, and the counter value of the clock counter 304 is zero, the shift register 340 is in MODE I and the shift registers 360 and 380 are in MODE III. In response to the 8th clock signal, the counter value in the clock counter 304 increases to 1 and the data B and C stored in the shift registers 360 and 380 respectively are shifted to the adjacent shift registers. However, in this case, since the shift register 340 is in a clock inhibiting state, the data B shifted from the shift register 360 cannot be stored in the register 340. Consequently, only the data C in the shift register 380 is shifted to the register 360.

In response to to increasing the counter value by 1, the shift registers 340 and 360 switch to MODE I to inhibit the clock and shift register 380 switches to MODE III to receive fresh data D from the latching circuit 24. In this condition, the clock signal CLOCK from the clock signal generator 20 is inputted to the clock counter 304. The clock counter 304 is responsive to the 8th clock pulse to increase the value thereof to 2. In this condition, the shift registers 340, 360 and 380 are all in MODE I to inhibit clock pulse input. At the same time, the logic circuit 320 produces a reset signal RESET having a value of 1. After the time delay $\tau_3$ set by the delay circuit 327, the reset signal RESET to the flip-flop 306 through the reset input terminal R switches the flip-flop output to its low or zero value. to thereby close the clock gate 302. The reset signal RESET is fed to the clock counter 304 to reset the counter value and fed to the shift registers 340, 360 and 380 through the delay circuit 327 to cause the registers to output their contents to the corresponding latching circuit 342, 362 and 382 respectively. The latched value in each latching circuit 342, 362 and 382 is then outputted to the arithmetic circuit 50.

Figure 12:
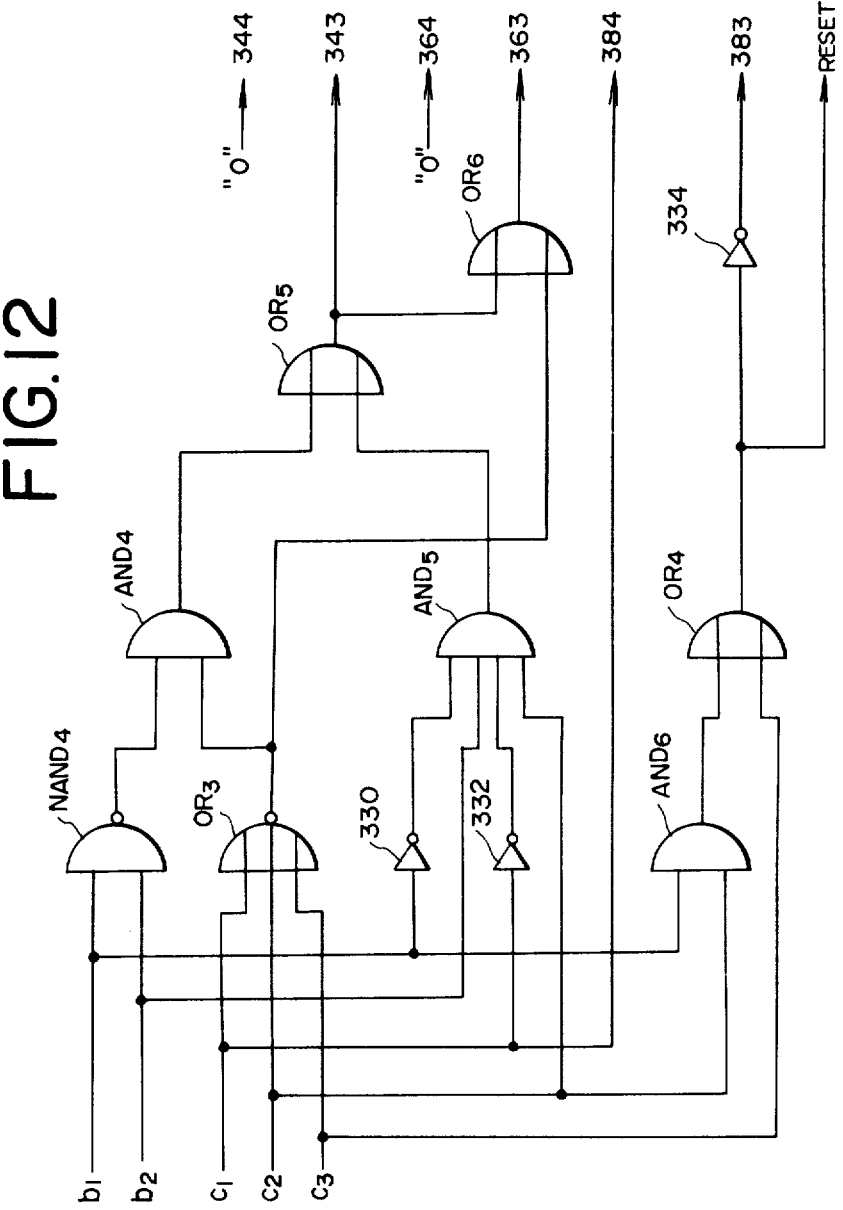
FIG. 12 is a circuit diagram of the logic circuit in the memory means.

Referring now to FIG. 12, there is illustrated a preferred circuit construction of the logic circuit 320 which serves as the memory control section 32 of the memory unit 30. The logic circuit 320 generally comprises NAND gate NAND$_4$, AND gates AND$_4$, AND$_5$ and AND$_6$ and OR gates OR$_3$, OR$_4$, OR$_5$ and OR$_6$. The NAND$_4$ is connected with the NAND$_1$ and NAND$_3$ of the main controller 50 to receive the bits $b_1$ and $b_2$ from the shift control signal SHIFT. The gate OR$_3$ has three input terminals each of which is connected to an address location of the clock counter 304. Therefore, through the gates NAND$_4$ and OR$_3$, shift control signals $b_1$ and $b_2$ and counter value $c_1$, $c_2$ and $c_3$ are inputted to the logic circuit 320. Further, the output of the gate NAND$_3$ of the main controller 50 is inputted to the gate AND$_6$, and inverted by inverter 330 and then inputted to gate AND$_5$. The output of gate NAND$_1$ is also inputted to gate AND$_5$ together with the inverted value of bit $c_1$ from the clock counter which is inputted through an inverter 332. Bit $c_2$ from the counter is also inputted to gate AND$_5$. The counter value bit $c_2$ is further inputted to gate AND$_6$. The gate AND$_4$ receives outputs from gates NAND$_4$ and OR$_3$ and produces an output to be fed to an input of gate OR$_5$. The other input of gate OR$_5$ receives an output of gate AND$_5$. Therefore, gate OR$_5$ determines the value of the output from the terminal 343 based upon the outputs from gates AND$_4$ and OR$_5$. The output of gate OR$_5$ is the same as the output of the terminal 343 is also fed to gate OR$_6$ which also receives the output from gate OR$_3$. Gate OR$_6$ determines the value outputted at the terminal 363. The output of gate OR$_4$ is inverted by an inverter 334 and outputted at terminal 383. The output of gate OR$_4$ is further outputted as the reset signal RESET.

As will be seen from the drawing, the output values of the output terminals 344 and 364 are constantly zero and do not vary. Further, the output terminal 384 outputs the value $c_1$ of the clock counter 304 as is.

Figure 13:
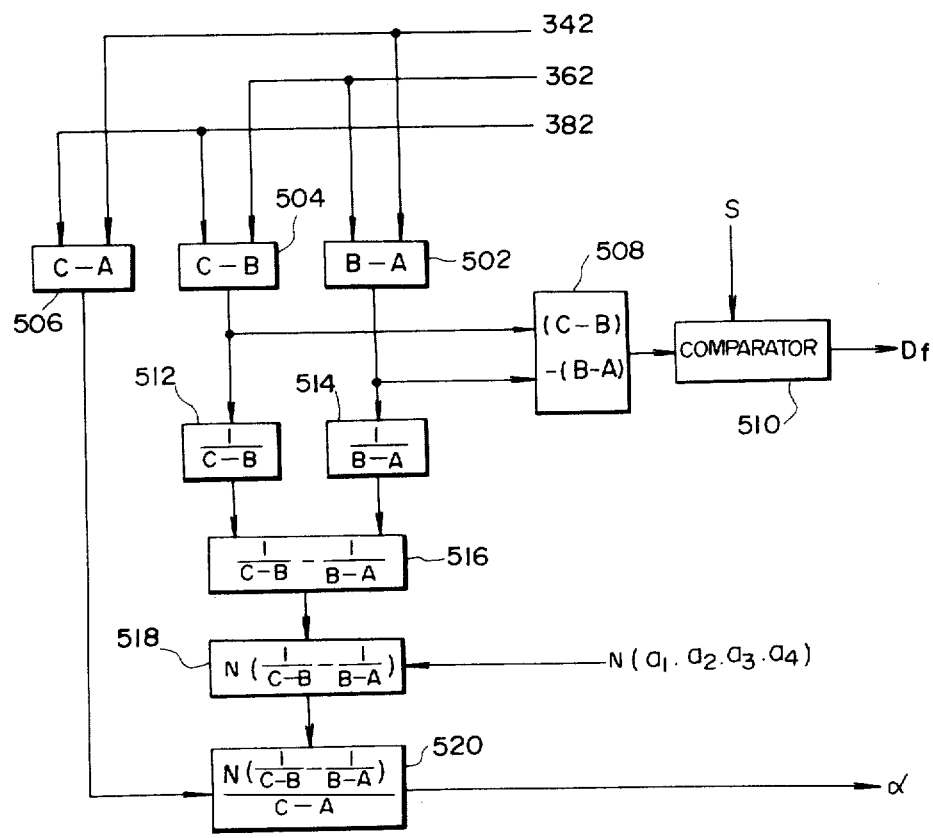
FIG. 13 is a block diagram of arthemetic operations effected in the logic circuit of FIG. 12.

FIG. 13 illustrates a preferred construction of the arithmetic circuit for determining the acceleration and-/or deceleration rate $\alpha$. The arithmetic circuit 50 generally comprises a plurality of subtractors, dividers and multipliers. Subtractors 502, 504 and 506 are connected to the latching circuits 342, 362 and 382 respectively of the memory unit 30 in order to receive therefrom the register outputs A, B, C . . . representative of respective counter pulse periods of the sensor signal. Each subtractor 502, 504 and 506 subtracts a register output value from that of the other register. Namely, the subtractor 502 calculates B−A, subtractor 504 calculates C−B and subtractor 506 calculates C−A.

It is advantageous to use the outputs (B−A, C−B) of the subtractor 502 and 504 to represent the periods while the predetermined number of pulses of the sensor signal are being counted. The outputs of the subtractors 502 and 504 are fed to a subtractor 508. The subtractor 508 effects the following calculation:

$$(C-B)-(B-A)=\alpha t$$

to obtain the difference $\alpha t$ of the periods. The difference $\alpha t$ is then compared in a comparator 510 with a predetermined value $t_{set}$ to determine whether the sensor signal period has varied during the measurement period. At the same time, the output of the subtractors 502 and 504 are inputted to dividers 512 and 514 which generate the respective reciprocal value (1/C−B, 1/B−A) of the subtractor outputs (C−B, B−A). The divider output (1/C−B, 1/B−A) are fed to a subtractor 516 to calculate the value of $$[1/(C-B)]-[1/(B-A)]$$

The output of the subtractor 516 is fed to a multiplier 518 which multiplies output of the subtractor 516 by the pulse number N determined by the main controller 40 and indicated in the pulse number control signal N ($a_1$, $a_2$, $a_3$, $a_4$). Accordingly, the multiplier 518 is connected to the main controller 40. In response to the input from the main controller 40, indicative of the determined pulse number, the multiplier calculates the value of $$N\left(\frac{1}{C-B}-\frac{1}{B-A}\right)$$

The result of this multiplication is fed to a divider 520. In the divider 520, the output of the multiplyer 518 is divided by the output of the subtractor 506 to obtain the the acceleration and/or deceleration rate $\alpha$ as follows:

$$N\left(\frac{1}{C-B}-\frac{1}{B-A}\right)/(C-A)=\alpha$$

Based on the result of this previously described comparation operation, the comparator 510 outputs a binary code signal $D_f$ which is fed to the main controller 40 and the output section 60. The output of the divider 520, which is indicative of the determined acceleration and deceleration rate $\alpha$, is also fed to the output section 60.

Figure 14:
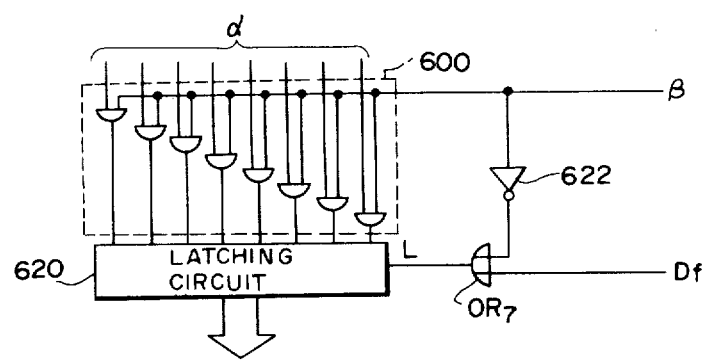
FIG. 14 is a circuit diagram of an output section outputting a signal indicative of the determined acceleration or deceleration of the vehicle.

FIG. 14 shows a preferred construction of the output section 60 according to the present invention. The output section 60 comprises a gate circuit 600 and a latching circuit 620. The gate circuit 600 has 8 AND gates each of which corresponds to an output terminal of the arithmetic circuit 50. To each of the AND gates, one bit of the output α, which is in the form of an 8-bit binary number, is inputted. Also, each AND gate of the gate circuit 600 is connected to gate NAND$_2$ (FIG. 8) to receive therefrom the decision signal β. The gates 600 open in response to the decision signal β having a value of 1. In this position, the output of the arithmetic circuit 50 passes through the gate circuit 600 and is received by the latching circuit 620. The decision signal β is also inputted to an OR gate OR$_7$ through an inverter 622. The binary code signal D$_f$ is also inputted to the gate OR$_7$ from the comparator 510. The gate OR$_7$ outputs a latching signal L whenever the input β is zero or the input D$_f$ is 1. If the latching signal L is outputted from gate OR$_7$ to latching circuit 620, the input value from the gate circuit 600 is latched and outputted. If the latching signal L is absent, the latching circuit 620 permit the input from the gate circuit to pass therethrough and be outputted. In other words, if a difference between the sensor signal periods is detected and decision signals β and D$_f$ are set to have values of 0 and 1 respectively the latching circuit 620 outputs the gate circuit 600 output indicative of the acceleration and/or deceleration rate α corresponding to the determined difference between the sensor signal periods. On the other hand, if the difference between the sensor signal period is determined to be constant, i.e., (D$_f$=0) and the value of the decision signal β is 1, the latching circuit 620 outputs the latched value and therefore maintains a constant output value. When both decision signals D$_f$ and β are zero, the latching circuit output goes to zero indicating that the frequency of the sensor signal is constant and the vehicle or vehicle wheel speed is constant.

Thus, according to the present invention, there is provided a device for determining the acceleration and/or deceleration rate of an automotive vehicle speed or vehicle wheel rotation speed. The device according to the invention can effectively measure a wide range of vehicle speeds or wheel rotation speeds and adjust the number of pulses over which the sensor signal period to be compared is measured for accurately ascertaining any variation of the sensor signal period in order to adapt the pulse number to the vehicle speed or wheel rotation speed. The accuracy of results can be maintained within an acceptable range so that it may be applied to an anti-skid control system for the brake system of an automotive vehicle.

Although the present invention has been described in detail in terms of the preferred embodiment of the present invention and with reference to the accompanying drawings, the invention should not be limited to the specific embodiment shown hereabove. For example, the device of the present invention can be applied for determining the vehicle or wheel rotation speed per se. Further, possible modifications expected from the foregoing descriptions are to be considered as to be included in the present invention.

What is claimed is:

1. A device for determining the acceleration or deceleration of an object comprising:
    a speed sensor for determining the speed of the object and producing a sensor signal in the form a train of pulses, each of a period corresponding to the determined speed of the object;
    a clock signal generator for producing a train of clock pulses of a constant frequency;
    a counter means for counting the clock pulses and for latching the counted value after a selected number of sensor signal pulses have been received;
    a memory means for storing the latched counter values, wherein said memory means renews at least one of the stored values each cycle of device operation in a selected shifting mode;
    an arithmetic means for processing the stored values in said memory means and determining the acceleration or deceleration of the object on the basis of any difference between the stored values in said memory means, said arithmetic means producing a command for increasing the number of pulses of the sensor signal over which the clock pulses are to be measured when the difference between the stored value is less than a predetermined value; and
    a controller means responsive to said command to determine the number of pulses of the sensor signal over which the clock pulses are measured for a succeeding cycle of device operation, said controller being operative for determining the shifting mode for the values stored in the memory means on the basis of the selected number of pulses, said controller means producing a latch signal for causing said counter means to latch the counted value and a shift control signal for controlling the shifting operation of said memory means.

2. A device for determining the acceleration or deceleration of an object comprising:
    a speed sensor means for determining the speed of the object and producing a sensor signal in a form of train of pulses of a period indicative of the determined speed of the object;
    a counter means for measuring the total period of a predetermined number of sensor signal pulses and latching the measured period value in response to the last of the predetermined number of sensor signal pulses, said counter means including a clock signal generator for generating a train of clock signal pulses having a fixed period indicative of a unit of time for measurement of the period of the predetermined number of sensor signal pulses;
    a memory means for storing the latched period values, said memory means renewing at least one of the stored values according to a selected shifting mode determined on the basis of the result of an immediately preceding cycle of device operation;
    an arithmetic means for processing the stored values in said memory means and for determining any acceleration or deceleration of the object on the basis of any difference between the stored values in said memory means, said arithmetic means producing a command for increasing the number of pulses of the sensor signal over which the sensor signal period is measured when the difference between the stored values is less than a predetermined value; and
    a controller means responsive to said command to determine the number of pulses of the sensor signal over which the period is measured for a successive cycle of operation, said controller means further determining a shifting mode of the stored values in said memory section of the memory means based on the determined number of pulses, said controller means producing a latch signal for causing said counter means to latch the period value and a shift control signal for controlling the shifting operation of said memory means.

3. A device for determining the acceleration or deceleration of an object comprising:
- a speed sensor for determining the speed of the object and producing a sensor signal in a form of pulse having a period corresponding to the determined speed of the object;
- a clock signal generator producing a train of pulses having a fixed perod;
- a counter means for counting the clock signal pulses and latching the counted value after a predetermined number of sensor signals are received;
- a memory means having three memory sections for storing the latched counter value, , each memory section being operable to shift its stored value according to a predetermined shifting mode;
- an arithmetic means for processing the stored values in said memory means and determining the acceleration or deceleration of the object based on any difference between the stored values in said memory means, said arithmetic means producing a command for increasing the number of pulses of the sensor signal over which the clock pulses are counted when the difference between the stored value is less than a predetermined value;
- a controller means responsive to said command to determine the number of pulses of the sensor signal over which the clock pulses are to be counted for a subsequent cycle of operation, said controller means further determining the shifting mode of the stored value in said memory section of the memory means based on the determined number of pulses, said controller means producing a latch signal for causing said counter means to latch the counter value and a shift control signal for controlling the shifting operation of said memory means; and
- a unit for outputting a signal corresponding to the acceleration or deceleration.

4. A device for determining the acceleration or deceleration of an object comprising:
- a speed sensor means for determining the speed of the object and producing a sensor signal in the form of a train of pulses having a pulse period indicative of the determined speed of the object;
- a counter means for measuring the duration of a predetermined number of sensor signal pulses and latching a measured counter value in response to the last of the predetermined number of sensor signal pulses, said counter means including a clock signal generator for generating a clock pulse signal having a period indicative of a unit time for measurement of the duration of the predetermined number of sensor signal pulses;
- a memory means for storing the latched counter value, said memory means including first, second and third memory sections, said first memory section storing a first latched counter value, said second memory means storing a second latched counter value immediately following said first latched counter value, and said third memory section storing a third latched counter value, said first, second and third memory sections being operative to shift the stored values thereof according to a selected one of a plurality of predetermined shifting modes;
- an arithmetic means for processing the stored values in said memory means and determining the acceleration or deceleration of the object based on any difference between the stored values in said memory means, said arithmetic means producing a command for increasing the number of pulses of the sensor signal of which the duration is to be measured when the difference between the stored values is less than a predetermined value;
- a controller means responsive to said command to determine the number of pulses of the sensor signal of which the duration is to be measured during a subsequent arithmetic operation, said controller means further determining the shifting mode of the stored values in said memory sections of the memory means based on the determined number of pulses, said controller means producing a latch signal for causing said counter means to latch the counter value and a shift control signal for controlling the shifting operation of said memory means; and
- an unit for outputting a signal indicative of any acceleration or deceleration.

5. A device for determining the acceleration or deceleration of an object comprising:
- a speed sensor means for determining the speed of the object and producing a sensor signal in the form of pulse signals having a frequency indicative of the determined speed of the object;
- a counter means for sequential measurement of the duration of a predetermined number of pulses of the sensor signal pulse and latching the measured counter value in response to the last of the predetermined number of sensor signal pulses said counter means including a clock signal generator for generating clock pulses, the period of which corresponds to a unit of time of measurement, said counter means outputting a latched counter value for each cycle of device operation;
- a memory means for receiving the output of said counter means and storing the latched counter value, said memory means including first, second and third memory sections, each of said memory sections shiftably storing one of said latched counter values in a given order and effecting a shifting operation in accordance with a predetermined shifting mode selected from among a plurality of given modes corresponding to the number of pulses of the sensor signal of which the duration is to be measured;
- an arithmetic circuit for comparing the stored values from adjacent memory sections to determine any difference therebetween and thereby determine the acceleration or deceleration of the object based on the determined difference, said arithmetic circuit producing a command for increasing the number of pulses of the sensor signal to be measured when absolute value of said difference between the stored values is less than a given value, said arithmetic circuit including an output means for outputting a signal indicative of the acceleration or deceleration of the object; and
- a controller means fresponsive to said command to determine the number of pulses of the sensor signal of which the duration is to be measured during a subsequent cycle of device operation, said controller means further determining the shifting mode for controlling the shifting operation of said memory sections based on the number of pulses to be counted, said controller means being operable to count the number of sensor signal pulses inputted thereto and produce a latching signal in response to counting a value corresponding to the determined number of pulses.

6. A device for determining the acceleration or deceleration of an object comprising:

a controller means for receiving a sensor signal produced by a speed sensor, said signal having a period indicative of the speed of the object, and counting a predetermined number of pulses of the sensor signal, said controller means being operable to increase the number of pulses to be counted in a present cycle of device operation based on any change in sensor signal period determined during a previous cycle of device operation and to produce both a latching signal when the counted value becomes equal to the predetermined number, and a shifting mode signal corresponding to the number of pulses to be counted;

a counter means for sequentially measuring the duration of the predetermined number of pulses of the sensor signal and latching the measured counter value responsive to said latching signal said counter means including a clock signal generator for sequentially generating clock pulses having a constant period corresponding to a unit of time of measurement, said counter means outputting the latched counter value at the beginning of each cycle of device operation;

a memory means for receiving the output from said counter means and storing the latched counter value, said memory means including first, second and third memory sections, each of said memory sections shiftably storing one of said latched counter values in a given order, said memory means shifting newly latched counter values and the contents of said memory sections in a predetermined shifting mode selected from among a plurality of shifting modes in accordance with the number of pulses of the sensor signal of which the duration is to be measured; and an arithmetic circuit for comparing the contents of adjacent memory sections to determine any difference therebetween and to determine the acceleration or deceleration of the object based on the determined difference, said arithmetic means producing a command for increasing the number of pulses of the sensor signal of which the duration is to be measured between stored values is less than a given value, said arithmetic circuit including an output means for outputting the resulting acceleration or deceleration of the object.

7. A device as set forth in any one of claims 1 to 6 inclusive, wherein said controller means further generates a reset signal for resetting the output of the arithmetic means, said reset signal being transmitted to said counter means to cause the latter to output the latched counter value.

8. A device as set forth in claim 7, wherein said controller means produces a decision signal when the predetermined number of pulses of the sensor signal of which the duration is to be measured reaches a given maximum value and no resolvable difference between the sensor signal periods is detected, the output of the arithmetic means being responsive thereupon to the decision signal to produce an output indicative of zero acceleration.

9. A device as set forth in claim 7, wherein said memory means comprises a memory control section and wherein said memory sections, and said memory control section is responsive to said reset signal to perform the shifting operation on the contents of said memory sections according to a selected shifting pattern determined by said controller means.

10. A device as set forth in claim 9, wherein each of said memory sections comprise an 8-bit shift register and the latched counter value is inputted to the shift register in the form of an 8-bit binary signal.

11. A device as set forth in claim 10, wherein said shifting mode signal is a 2-bit binary signal.

12. A device for determining acceleration or deceleration of a rotating wheel of an automotive vehicle comprising:

a controller means for receiving a sensor signal, which is produced by a speed sensor, said sensor signal having a period indicative of the rotational speed of the vehicle wheel, said controller means further counting inputted pulses from the sensor signal and operable to increase the number of pulses to be counted based on any change in sensor signal period determined during a previous cycle of device operation and producing a latching signal when the number of pulses counted becomes equal to a predetermined number and producing a shifting mode signal according to the number of pulses to be counted;

a counter means for sequentially measuring the duration of the predetermined number of pulses of the sensor signal and latching the measured counter value in response to said latching signal, said counter means including a clock signal generator generating clock pulses of a constant period corresponding to a unit of time measurement, said counter means outputting one latched counter value at the beginning of each cycle of device operation;

a memory means for receiving outputs from said counter means and storing the latched counter values, said memory means replacing at least one of the previously stored values with a newly received counter value during each cycle of device operation; and an arithmetic circuit for comparing a pair of stored values in said memory means in order to determine any difference therebetween and thereby determine the acceleration or deceleration of the wheel based on the determined difference, said arithmetic means producing a command for increasing the number of pulses of the sensor signal of which the duration is to be measured when the absolute value of said difference between the stored value is less than a given value, said arithmetic circuit including an output means for outputting the determined acceleration or deceleration of the wheel.

13. A device for determining the acceleration or deceleration of a rotating wheel of an automotive vehicle comprising:

a controller means for receiving a sensor signal produced by a speed sensor, said signal having a period indicative of the rotational speed of the vehicle wheel, said controller means being operable to count the inputted pulses from the sensor signal and to increment the number of pulses to be counted based on any change in sensor signal period determined from a previous cycle of device operation and to produce a latching signal when the counted value becomes equal to a predetermined number of pulses, and a shifting mode signal according to the number of pulses to be measured;

a counter means for sequentially measuring the duration of the predetermined number of pulses of the sensor signal and latching the measured counter value in response to said latching signal, said counter means including a clock signal generator for generating clock pulses having a constant period corresponding to a unit of time for measurement, said counter means outputting a latched counter value at the beginning of each cycle of device operation;

a memory means for receiving the output from said counter means and storing the latched counter values, said memory means replacing at least one of the stored values with a newly received counter output according to a selected shifting mode determined on the basis of a shifting mode signal from an immediately preceding cycle of device operation; and an arithmetic circuit for comparing a pair of stored counter values to determine any difference therebetween and to thereby determine the acceleration or deceleration of the wheel based on the determined difference, said arithmetic means being operable to produce a command for increasing the number of pulses of the sensor signal of which the duration is to be measured when the absolute value of said difference between counter values is less than a given value, said arithmetic circuit including an output means for outputting a signal indicative of the acceleration or deceleration of the wheel.

14. A device for determining the acceleration or deceleration of a rotating wheel of an automotive vehicle including a wheel rotation speed sensor for determining wheel rotation speed and generating a sensor signal having a period proportional to the determined rotational speed of the vehicle wheel, a clock signal generator for generating a clock signal of a fixed period indicative of a unit time of measurement, and arithmetic means for receiving said sensor signal and comparing determined durations of successive groups of sensor signal pulses to determine any change in sensor signal period and to thereby determine the acceleration or deceleration of the wheel based on the determined sensor signal period change said arithmatic means being operable to output a resultant acceleration or deceleration value, the improvement comprising:

a memory means having memory sections for shiftably storing the measured sensor signal pulse group durations and shifting the contents thereof during each cycle of device operation; and a controller means for determining the presence of any difference between sensor signal periods and for determining the number of pulses per pulse group over which the duration is measured based on any determined change of period between a preceding cycle of device operation and a current cycle, said controller means being operable to increment the number of pulses per group when the change in the sensor signal period is less than a predetermined value, and to control the shifting operation of the memory section in the memory means.

15. A device for determining the acceleration or deceleration of a rotating wheel of an automotive vehicle, said device including a wheel rotation speed sensor for determining wheel rotation speed and generating a sensor signal having a pulse period proportional to the determined rotation speed of the vehicle wheel, a clock signal generator for generating a clock signal having a fixed period indicative of a unit of time of measurement, an arithmetic means for receiving said sensor signal and for comparing durations of successive groups of pulses of said sensor signal to determine any change in sensor signal period and to thereby determine any acceleration or deceleration of the wheel rotation speed and to output a resultant acceleration or deceleration value, the improvement comprising:

a memory means for storing pulse group duration values, said memory means including first, second and third memory sections, said first memory section storing a first pulse group duration value, said second memory means storing a second pulse group duration value, said second pulse group sequentially following said first pulse group, and said third memory section storing a third pulse group duration value, said third group sequentially following said second group, said first, second and third memory sections being operable to shift their respective content values according to a predetermined shifting mode;

a controller means for determining the presence of any change in sensor signal period and for determining a number of pulses per pulse group based on any determined change from a preceding cycle of device operation, said controller device being operable to increment the number of pulses per group when the change in the sensor signal period is less than a predetermined value and to control shifting operation of the memory section in the memory means.

16. The device as set forth in claims 13, 14 or 15, wherein said controller means generates a latching signal when the number of sensor signal pulses received equals the predetermined number of pulses per group.

17. The device as set forth in claim 16, wherein said controller means is responsive to an output of the arithmetic means indicative of the determined number of pulses per group and counts the sensor signal pulses until the counter value equals the predetermined pulse number, said arithmetic means output being incremented at a given rate for each cycle of device operation until a change in the sensor signal duration is detected or until the number of pulses per group reaches a predetermined maximum number.

18. The device as set forth in claim 17, wherein said arithmetic means generates a reset signal in response to the last pulse of each pulse group for resetting the sensor signal pulse count and initiating the shifting operation to thereby delineate each cycle of the device operation and the device is responsive the reset signal to start the next cycle of operation after a predetermined time lag.

19. The device as set forth in claim 18, wherein said memory means is responsive to said reset signal to initiate the shifting operation of the contents thereof according to a pre-selected shifting pattern determined by the controller means.

20. A method for determining the acceleration or deceleration of a moving object comprising the steps of:

measuring the current speed of the moving object and producing a first signal having a period corresponding to the determined speed of the object by reference to a clock signal having a constant period which is representative of a unit of time of measurement;

comparing the duration of successive groups of pulses of the sensor signal in order to determine any difference between the durations thereof;

determining the acceleration or deceleration of the object based on any determined difference between the durations; and discriminating whether the determined difference between the durations exceeds a predetermined value and generating a command for incrementing, at a given rate, the number of pulses of the sensor signal per pulse group of which the duration is subsequently to be measured if the determined difference is less than the predetermined value.

21. The method as set forth in claim 20, wherein a reset signal is generated during the step of determining the acceleration or deceleration, and reset signal acting as start command for starting, a cycle of device operation.

22. The method as set forth in claim 21, wherein said durations are stored in memory means having memory sections for shiftably storing successively determined durations, said memory sections being responsive to the reset signal to perform a shifting operation of the stored values according to a selected shifting pattern determined in accordance with the determined number of pulses per group.

23. The device for determining the acceleration of a moving object comprising:
(a) a speed sensor for outputting a speed sensor signal in the form of a train of pulses, each having an instantaneous period related to the instantaneous speed of the object;
(b) means responsive to the speed sensor signal for timing the duration of a group of a selectable number of sensor signal pulses;
(c) means responsive to said timing means for calculating any difference between the durations of two successive sensor signal pulse groups and calculating the acceleration rate of the object on the basis of said difference and said selectable number of pulses per group; and
(d) control means responsive to said calculating means for selecting the number of sensor signal pulses per pulse group in accordance with said calculated difference.

24. The device of claim 23, wherein said control means increases the number of pulses per pulse group when the calculated difference is less than a predetermined value and resets the number of pulses per group to a predetermined base number when the calculated difference exceeds the predetermined value.

25. The device of claim 24, wherein said control means is operative to continue to increase the number of pulses per group up to a predetermined maximum number until the difference calculated at the completion of the timing of each pulse group equals the predetermined value.

26. The device of claim 25, wherein said control means is operable to reset the number of pulses per group to the base value if the difference calculated after timing a pulse group having the maximum number of pulses is less than the predetermined value.

27. The device of claim 23, further comprising a memory device responsive to said timing means for storing at least the two most recently timed pulse group duration values, said memory device holding the stored values in a predetermined order and being operable, in response to completing the timing of a pulse group, to receive the newly timed duration value and to shift the previously stored values to accommodate the new value in accordance with a shifting mode selected from among a plurality of predetermined shifting modes, and wherein said control means selects the shifting mode of said memory device in accordance with the current number of pulses comprising a pulse group.

28. The device of claim 27, wherein said control means is operable to select the shifting mode in accordance with the currently selected number of pulses in a pulse group and the previously selected number of pulses in a pulse group.

* * * * *